US009489315B2

(12) United States Patent
Courousse

(10) Patent No.: US 9,489,315 B2
(45) Date of Patent: Nov. 8, 2016

(54) METHOD OF EXECUTING, BY A MICROPROCESSOR, A POLYMORPHIC BINARY CODE OF A PREDETERMINED FUNCTION

(71) Applicant: Commissariat á l'energie atomique et aux énergies alternatives, Paris (FR)

(72) Inventor: Damien Courousse, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 101 days.

(21) Appl. No.: 14/504,003

(22) Filed: Oct. 1, 2014

(65) Prior Publication Data

US 2015/0095659 A1 Apr. 2, 2015

(30) Foreign Application Priority Data

Oct. 1, 2013 (FR) ....................................... 1359473

(51) Int. Cl.
*G06F 21/55* (2013.01)
*G06F 12/14* (2006.01)
(Continued)

(52) U.S. Cl.
CPC ......... *G06F 12/1408* (2013.01); *G06F 9/3001* (2013.01); *G06F 9/30029* (2013.01); *G06F 21/558* (2013.01); *G06F 21/602* (2013.01); *G06F 2212/1052* (2013.01)

(58) Field of Classification Search
None
See application file for complete search history.

(56) References Cited

U.S. PATENT DOCUMENTS 6,591,415 B1 * 7/2003 Torrubia-Saez ........ G06F 21/10 717/158
7,966,499 B2 * 6/2011 Kandanchatha ........ G06F 21/50 713/190

(Continued)

FOREIGN PATENT DOCUMENTS

EP 2343663 7/2011
WO 0117163 3/2001

(Continued)

OTHER PUBLICATIONS

Afacan "Object Oriented Programming in C: A Case Study of TMS320C6418," Proceedings of the work-in-progress session, LCTES 2012.

Agosta et al., "A code morphing methodology to automate power analysis countermeasures," Proceedings of the 49th Annual ACM/IEEE Design Automation Conference (DAC'12), pp. 77-82, (2012).

(Continued)

*Primary Examiner* — Hadi Armouche
*Assistant Examiner* — Malcolm Cribbs
(74) *Attorney, Agent, or Firm* — Occhiuti & Rohlicek LLP

(57) ABSTRACT

Executing polymorphic binary code of a predetermined function includes acquiring polymorphic binary code of the function, the code having instruction blocks and control instructions. One block acquires a random number; the other defines a specific generator that generates target instructions to execute the function. The control instructions place the target instructions in memory. Each instruction has an opcode that codes a nature of an operation to be executed, and operands that define parameters of the operation. The generator incorporates coding variants of the function and selection instructions. Each variant generates instructions that perform the function. These instructions differ from each other and enable choosing a variant, based on the random number, to generate the target instructions. The choice is made only between different coding variants of the predetermined function.

10 Claims, 12 Drawing Sheets

(51) Int. Cl.
*G06F 9/30* (2006.01)
*G06F 21/60* (2013.01)

(56) References Cited

U.S. PATENT DOCUMENTS

| | | | | |
|---|---|---|---|---|
| 2002/0016918 | A1 * | 2/2002 | Tucker | G06F 21/14 713/190 |
| 2003/0115573 | A1 * | 6/2003 | Syme | G06F 9/4433 717/111 |
| 2005/0271202 | A1 * | 12/2005 | Shu | G06F 9/3001 380/29 |
| 2008/0016583 | A1 * | 1/2008 | Giraud | G06F 21/75 726/34 |
| 2009/0083521 | A1 * | 3/2009 | Sato | G06F 21/14 712/220 |
| 2009/0217008 | A1 * | 8/2009 | Sato | G06F 21/125 712/221 |
| 2009/0228717 | A1 * | 9/2009 | Futa | G06F 21/14 713/190 |
| 2010/0281459 | A1 * | 11/2010 | Betouin | G06F 8/423 717/106 |
| 2011/0283115 | A1 * | 11/2011 | Junod | G06F 21/14 713/190 |
| 2012/0159194 | A1 * | 6/2012 | Anderson | H04L 9/002 713/190 |
| 2014/0165030 | A1 * | 6/2014 | Chevallier-Mames | G06F 21/14 717/110 |
| 2014/0189871 | A1 * | 7/2014 | Nash | G06F 21/564 726/24 |

FOREIGN PATENT DOCUMENTS

| | | |
|---|---|---|
| WO | 0227478 | 4/2002 |
| WO | 02054228 | 7/2002 |

OTHER PUBLICATIONS

Amarilli et al., "Can code polymorphism limit information leakage?" WISTP 2011, Lecture Notes in Computer Science, vol. 6633, p. 1-21, Springer (2011).

Charles, "Basic infrastructure for dynamic code generation", workshop "Dynamic compilation everywhere," 7th HiPEAC Conference, (2012).

Charles, "DeGoal Documentation: Dynamic Execution of Generated Optimized kernel from Algorithmic Level," (2013).

Couroussé et al, "Dynamic code generation: an experiment on matrix multiplication," Proceedings of the work-in-progress session, LCTES 2012.

Ding and Zhang, "The Static Analysis of Worst-Case Inter-Core Communication Latency in CMPs with 2D-Mesh NoC," Proceedings of the work-in-progress session, LCTES 2012.

Herbst et al., "An AES Smart Card Implementation Resistant to Power Analysis Attacks," ACNS 2006, LNCS 3989, pp. 239-252, Springer (2006).

Lhuillier and Courousse, "Embedded System Memory Allocator Optimization Using Dynamic Code Generation," ACM Transactions on Embedded Computing Systems, vol. 7 (2012).

Paun and Monsuez, "Adaptable and Precise Worst Case Execution Time Estimation Tool," Proceedings of the work-in-progress session, LCTES 2012.

Subedi and Zhang, "WCET Estimation of Multi-Core Processors with the MSI Cache Coherency Protocol," Proceedings of the work-in-progress session, LCTES 2012.

Wang et al., "Introducing Service-oriented Concepts into Reconfigurable MPSoC on FPGA for Coarse-grained Parallelization," Proceedings of the work-in-progress session, LCTES 2012.

Westlund, "Random Number Generation Using the MSP430," Application Report SLAA338, Texas Instruments (2006).

* cited by examiner

54

52

```
MOV A, ASM_input + 0   ;  load a0
XRL A, ASM_key + 0     ;  add  k0

MOVC A, @A + DPTR      ;  substitute  a0
MOV ASM_input,  A      ;  store  a0

MOV A, ASM_input + 4   ;  load  a4
XRL A, ASM_key + 4     ;  add  k4

MOVC A, @A + DPTR      ;  substitute  a4
MOV ASM_input + 4, A   ;  store  a4

MOV A, ASM_input + 8   ;  load  a8
XRL A, ASM_key + 8     ;  add  k8

MOVC A, @A + DPTR      ;  substitute a8
MOV ASM_input + 8, A   ;  store a8

MOV A, ASM_input + 12  ; load a12
XRL A, ASM_key + 12    ; add k12

MOVC A, @A + DPTR      ; substitute a12
MOV ASM_input + 12, A  ; store a12
```

```
void compilette(cdgInsnT* code)  {
    #[
Begin code Prelude ASM_input , ASM_key, DPTR
Type uint32_t int 32
Alloc uint32_t A

lw A, @(#(ASM_input + 0)) // load a0
add A, #(ASM_key + 0)     // add k0

mv A, @(A + #(DPTR))      // substitute a0
lw  @(#(ASM_input)), A    // store a0

    End
  ]#
}
```

Fig. 5

```
#include <cdg-msp430.h>

void compilette(cdgInsnT* code)   {
CDGBEGIN(code);
CDGArg(3);
CDGStopParamState();
cdgRegDescrT A = CDGAlloc_r();
CDGgenlw_rii(A,(ASM_input) , (0));
CDGgenadd_ri(A,(ASM_key + 0));
CDGgenlw_rri(A,A, (DPTR));
CDGgensw_iir((ASM_input) , (0) , A);
CDGEND();
}
```

Fig. 6

```
# include <stdlib.h>
# define ALEA_SEED 0xABDE1234

void  CDGgenadd_ri(cdgRegDescrT rdest, unsigned int immediateVal)
 {
srand (ALEA_SEED);
 int alea = rand ();

    if (isEven(alea)){
          //  rdest  := rdest + immediateVal
          scheduleInstruction(add_ri, rdest, immediateVal);
    }
    else  {
          int k = rand() & 0xFFFF;
          cdgRegDescrT rtmp = allocateReg();

          // rtmp   : = k
         scheduleInstruction(mov_ri, rtmp, (k));

         // rdest  : = rdest + rtmp
         scheduleInstruction(add_rr, rdest, rtmp);

         // rdest  : = rdest + (immediateVal - k)
         scheduleInstruction(add_ri, rdest, (immediateVal - k));
    }
}
```

Fig. 7

METHOD OF EXECUTING, BY A MICROPROCESSOR, A POLYMORPHIC BINARY CODE OF A PREDETERMINED FUNCTION

RELATED APPLICATIONS

Under 35 USC 119, this application claims the benefit of the Oct. 1, 2013 priority date of French application FR1359473, the content of which is herein incorporated by reference in its entirety.

FIELD OF DISCLOSURE

The invention relates to a method of executing, by a microprocessor, a polymorphic binary code of a predetermined function, to a non-transitory and tangible information-storage medium having encoded thereon such a polymorphic binary code, to execution of a cryptographic primitive, a predefined function of which is executed according to this execution method, and to a method of constructing this polymorphic code.

BACKGROUND

Cryptological attacks are known. Examples of such attacks include side channel attacks, which make it possible to compromise the security of an information system based on the measurement of a physical signature of this system when it is operating. This physical signature can comprise one or more physical characteristics of the system, such as emitted electromagnetic radiation, delays between the execution of two instructions, or electrical power levels consumed by the system.

For example, an attack by power analysis (such as those known by the terms "simple power analysis", "differential power analysis", "correlation power analysis") makes it possible to determine the behavior of a computer program executed by a processor by measuring the electrical power consumed by the processor as it executes these instructions. Such attacks can be used to steal encryption keys during the operation of a cryptographic system. It is therefore desirable to be able to prevent such attacks.

There are methods for executing a computer program in such a way as to reduce the vulnerability to such attacks. These methods comprise, for example, the execution, by a microprocessor, of a polymorphic binary code of a predetermined function.

A polymorphic binary code is a binary code that changes form when it is executed by a microprocessor. This means the code changes form on each execution. "Change of form" means that the instructions executed by the microprocessor are different even if the input and output data processed by the binary code remain the same. The instructions are different if, after the same number of cycles of the microprocessor, the opcode, or the operand or operands, or even the literal values of the instruction executed are not the same. Such a method is described in the article by Giovanni Agosta et al., "A code morphing methodology to automate power analysis countermeasures", Proceedings of the 49th Annual ACM/IEEE Design Automation Conference (DAC'12), pages 77-82, June 2012.

This method does, however, present drawbacks. In particular, its implementation requires significant computational resources, in terms of computation cycles or memory needs. Its implementation also requires an ad hoc static compiler. This method can therefore be difficult to implement in systems having limited resources, such as embedded systems or chip cards, and furthermore demands the use of a dedicated compiler. In practice, this is costly if numerous processor architectures have to be supported.

As noted above, the known method comprises a dedicated static compiler. This compiler functions in the same way as a traditional compiler. However, it has been modified to extract, from the source code, "fragments" that are identified in the source code by specific attributes, or "pragmas."

The fragments are the parts of the binary code intended to be processed by the polymorphic engine described below. The fragments express the production of a function of the source code in one or more machine instructions expressed in a standardized manner by the static compiler. The standardization includes replacing the operands of the instructions, such as register identifiers or literal values, with symbolic constants.

The method comprises a polymorphic engine intended to be run during the execution of the compiled application (runtime) by the target processor. During execution, the polymorphic engine selects, for each fragment, the target instruction or instructions intended to be executed by the microprocessor to perform the predetermined function. These target instructions are selected by choosing a coding variant of pre-existing instructions contained in a dictionary of equivalences embedded in the binary code. The polymorphic engine and the dictionary of equivalences are constructed during the static compilation phase, before the execution of the binary code, using the ad hoc compiler described above.

The polymorphic engine works by applying the following steps to process each fragment to perform a specific set of target instructions to perform the predetermined function:

- search for and select, in a dictionary of equivalences constructed during the static compilation phase, a set of instructions semantically equivalent to the standardized instruction;
- destandardize the selected set of instructions, by replacing the symbolic constants with immediate values; and
- evaluating the literal values contained in the operands.

The operating mechanism of such a polymorphic engine is described in more detail in Section 3.1 of the article by Agosta et al., cited previously.

As an example, the operation of this polymorphic engine will be illustrated using the fragment "AND R0, R1, #0". This fragment, which is represented here in machine language, or assembly language, performs a logical "AND" between the value contained in the register "R1" and an immediate value "0", and stores the result in the register "R0". The polymorphic engine acquires this instruction then performs certain operations to select a variant of this instruction.

In particular, to select a variant of the instruction, the polymorphic engine engages in a search step during which it searches the dictionary of equivalences for the different blocks of instructions equivalent to the "AND" operation by using the name of the operation "AND" as a search key. These blocks are made up of one or more instructions expressed in machine language. Next, the polymorphic engine randomly selects one of these equivalent blocks of instructions. During the random selection from the different blocks of equivalent instructions, it is assumed here that the following set of instructions, which is semantically equivalent to the "AND R0, R1, #0" instruction, is selected in the dictionary of equivalences from other semantically equivalent blocks:

AND R0, R1, (#0 XOR const1)

AND R2, R1, (#0 XOR const2)

AND R0, R0, R2 in which "R2" is a previously emptied intermediate register, and in which "const1" and "const2" are two additional symbolic constants such that the value of "const2" is the logical opposite of the value of "const1".

Then, during the standardization step, immediate values are assigned to the symbolic constants and to the registers that had been replaced during the standardization step.

Thus, the polymorphic engine makes it possible to randomly generate variants for the fragments identified by the programmer, and extracted by the static compiler. The instructions associated with each variant by the polymorphic engine can be executed by the microprocessor without modifying the function of the program.

The semantic equivalences, or variants, are stored in a dictionary of equivalences defined during the compilation of the binary code. This compilation is performed from a source code of a computer program. Typically, such a program comprises a plurality of predetermined functions that are distinct from one another. Each of these predetermined functions is performed, in the compiled binary code, by one or more predetermined instructions. Since the dictionary of equivalences is constructed once and for all during the compilation, it has to contain the variants of all the predetermined instructions performing each of these functions. Such a dictionary therefore has a significant size.

The dictionary of equivalences, which is quite large, is then loaded in its entirety into memory each time the microprocessor executes a portion of the binary code that corresponds to one of the predetermined functions of the source code. Because of the design of the code generator, these portions of the binary code each have to invoke the dictionary of equivalences during their execution, despite the fact that some of the variants contained in this dictionary of equivalences are not suitable for use as variants for the predetermined function described by the particular portion of binary code. Furthermore, the execution of the steps of standardization and of search for equivalences to modify each instruction requires a significant number of compilation cycles. The foregoing method thus presents numerous drawbacks.

Also known is the method described in Antoine Amarilli et al., "Can code polymorphism limit information leakage?", WISTP 2011, Lecture Notes in Computer Science, vol. 6633, p. 1-21, Springer, 2011. This method describes the execution of a polymorphic binary code. In it, the polymorphism introduced is limited to the reorganization of the instructions of the binary code, separated into buckets for the analysis of the sequence followed by the program and the variants likely to be introduced. This method has been demonstrated only in a Scheme implementation, in which the rewriting of the program is performed by a "source-to-source" approach.

Furthermore, the above method requires significant computational resources for its execution, in part for the same reasons as the method of Agosta et al. This method also has the drawback of requiring a medium for Scheme in the embedded systems or in the chip cards that are commonly used.

Also known from the prior art are EP2343663 A1 (GEMALTO), and Cristoph Herbst et al., "An AES Smart Card Implementation Resistant to Power Analysis Attacks", ACNS 2006, LNCS 3989, p. 239-252, Springer, 2006.

SUMMARY

There is therefore a need for a method of executing a computer program that is secured against side channel cryptological attacks in a way that can be able to be implemented with reduced computational resources.

The invention therefore proposes a method of executing, by a microprocessor, a polymorphic binary code of a predetermined function. In this method, the code generator is specific to a single predetermined function. The choice of the coding variant is made only from the coding variants of the same predetermined function. Thus, if a code comprises a number of different predetermined functions, then this code comprises a specific generator for each of these predetermined functions and not, as in the prior art, one polymorphic engine capable of generating the specific set of target instructions of the different predetermined functions. Because the generator is specific, there is therefore no need to proceed with either a search for a specific set of target instructions of this predetermined function in a dictionary of equivalences comprising not only a number of specific sets of instructions for coding this predetermined function but also specific sets of instructions for coding other predetermined functions or with a destandardization of the selected specific set of instructions.

As a result of the foregoing method, each specific generator is executed in far fewer microprocessor computation cycles, and therefore much more rapidly than the generic generator of the prior art. Since the generator has to be executed for each predetermined function, it is more advantageous to use instead such a specific generator. Furthermore, in the claimed method, the coding variants are directly integrated. Thus, there is no need to load the dictionary of equivalences into memory. As a result, the claimed method can be implemented with reduced computational resources.

In one aspect, the invention features a method of executing, by a microprocessor, polymorphic binary code of a predetermined function. Such a method includes providing a microprocessor that has one or more arithmetic and logic units, and a memory configured to store instructions to be executed by the one or more arithmetic and logic units in a particular order. The method further includes acquiring polymorphic binary code of a predetermined function. This polymorphic binary code includes first and second blocks of instructions. The first block of instructions includes instructions that, when executed by the microprocessor, result in acquisition of a random number, and the second block of instructions includes instructions that, when executed by the microprocessor, define a specific generator that, when executed by the microprocessor, generates a set of target instructions. This set of target instructions, when executed by the microprocessor, carries out the predetermined function. The polymorphic binary code further includes control instructions that are configured for placing the set of target instructions, which are generated by the specific generator, into memory, and to do so in response to execution of the control instructions by the microprocessor. Each of these instructions includes an opcode and one or more operands. The opcode codes a nature of an operation to be executed, and the one or more operands define one or more values of parameters of the operation to be executed. The specific generator incorporates a plurality of coding variants of the predetermined function and selection instructions. Each such coding variant generates, when executed by the microprocessor, a specific set of instructions that perform the predetermined function. These specific sets of instructions are distinguished from one another by difference in at least one instruction opcode, one operand, a literal value, and a number of instructions. During execution of the specific generator by the microprocessor, the selection instructions make it possible to choose, as a function of a random number, from the plurality of available coding variants, a coding variant to be executed to generate the set of target instructions. The method also includes acquiring a random number through execution by the microprocessor of the first block of instructions, choosing a coding variant to be executed through execution by the microprocessor of the selection instructions, and in particular, doing so a function of the acquired random number, generating, through execution by the microprocessor, a specific generator of the set of target instructions by executing the coding variant chosen as a function of the acquired random number, shifting, in the memory of the microprocessor, through execution by microprocessor of the control instructions, the set of target instructions generated for the microprocessor to execute the target instructions, and executing the set of target instructions by the microprocessor. The choice of the coding variant to be executed is systematically made only between different coding variants of the predetermined function.

In some practices, the random number is pseudo-random.

In other practices, the binary code is selected to represent a cryptographic primitive.

In another aspect, the invention features a manufacture including a non-transitory and tangible computer-readable medium having encoded thereon polymorphic binary code of a predetermined function, the binary code being directly executable by a microprocessor that includes one or more arithmetic and logic units, and a memory in which instructions are stored, wherein the instructions are to be executed by the one or more arithmetic and logic units in an particular order. Each instruction includes an opcode that opcode codes a nature of an operation to be executed and one or more operands, that define one or more values of parameters of the operation to be executed. The polymorphic binary code further includes a first block of instructions, a second block of instructions, and control instructions. The first block of instructions includes instructions that, when executed by the microprocessor, acquiring a random number. The second block of instructions includes instructions for implementing a specific generator that, when executed by the microprocessor, generates a set of target instructions. When executed by the microprocessor, the set of target instructions performs the predetermined function. When executed by the microprocessor, the control instructions place the target instructions into the memory. The specific generator includes a plurality of coding variants of the predetermined function. When executed by the microprocessor, each coding variant generates a specific set of target instructions for performing the predetermined function. The sets of instructions from the specific set of instructions are distinguished from one another by a difference in at least one of an instruction opcode, an operand, a literal value, and a number of instructions. The instructions further comprise selection instructions that make it possible to choose from the plurality of available coding variants, as a function of the random number during execution of the specific generator by the microprocessor. The specific generator includes selection instructions that make it possible to choose only coding variants of the predetermined function such that the specific generator has no selection instructions that make it possible to choose coding variants of a function other than the predetermined function.

In some embodiments, one or more coding variants to be executed includes an operand whose value is a function of a random number such that the specific set of target instructions generated by execution of the coding variant varies as a function of the random number. Among these embodiments are those in which wherein the random number is a random number acquired by the first block.

Also included among the embodiments of the manufacture are those in which the control instructions are suitable for modifying, as a function of a random number, an order in the memory of at least two instructions of the set of target instructions generated by the specific generator.

In another embodiment of the manufacture, at least one coding variant includes an instruction whose operand corresponds to an identifier of a memory register of the microprocessor. In this embodiment, the binary code includes instructions for modifying a value of the operand as a function of the same or of another random number so as to modify an assignment of registers of the microprocessor each time the random number is modified.

In yet another embodiment of the manufacture, the predetermined function is configured to process a datum having a value that is only known at upon execution of the predetermined function by the microprocessor. In this embodiment, the specific generator is configured for generating a set of specific instructions performing the function, and the value of the datum is directly and only contained in the operands of the specific instructions and not in a register.

In another aspect, the invention includes a method for constructing a polymorphic binary code for execution of a predetermined function. This method includes acquiring source code of the predetermined function to be executed, and causing a compiler to compile the acquired source code to form executable polymorphic binary code according to any of the methods recited above.

In yet another aspect, the invention includes executing polymorphic binary code of a predetermined function includes acquiring polymorphic binary code of the function, the code having instruction blocks and control instructions. One block acquires a random number; the other defines a specific generator that generates target instructions to execute the function. The control instructions place the target instructions in memory. Each instruction has an opcode that codes a nature of an operation to be executed, and operands that define parameters of the operation. The generator incorporates coding variants of the function and selection instructions. Each variant generates a instructions that perform the function. These instructions differ from each other and enable choosing a variant, based on the random number, to generate the target instructions. The choice is made only between different coding variants of the predetermined function.

An advantage of the invention is that, by choosing an operand whose value is a function of the same or of another random number, a number of coding variants can be obtained simply from this single variant as a function of the value taken by the random number. Many additional variants can thus be generated from a reduced number of coding variants. This yields the benefit of a wide diversity of coding variants without the need for a dictionary containing each of these variants. Avoiding the need for such a dictionary reduces the memory imprint required to execute the binary code.

Another advantage is that by modifying, as a function of the random number, the order in the memory of at least two instructions of the set of target instructions generated, a number of additional coding variants can be obtained simply from this single variant.

Yet another advantage is that, by modifying, as a function of the random number an operand of an instruction corresponding to a memory register of the microprocessor, a number of additional coding variants can be obtained simply from this single variant;

Another advantage is that, by modifying, as a function of the random number, the literal value in an instruction, a number of additional coding variants can be obtained simply from this single variant.

An additional advantage is that by generating a set of specific instructions performing a function processing a datum whose value is known only at the time of execution of the program, and in which the value of this datum is directly and uniquely contained in the operands of these specific instructions, the form of the instruction that will be executed is known only at the time of execution.

DESCRIPTION OF THE FIGURES

The invention will be better understood on reading the following description, given solely as a nonlimiting example and with reference to the drawings in which:

FIG. 4 is a portion of source code of an exemplary predetermined function for which the polymorphic binary code of FIG. 2 has to be constructed using the method of FIG. 3;

FIGS. 5 and 6 represent portions of source code for producing the predetermined function of FIG. 4;

FIG. 7 is a portion of source code for producing a specific generator of the polymorphic binary code of FIG. 2;

In these figures, the same references are used to designate the same elements.

Hereinafter in this description, the features and functions that are well known to those skilled in the art are not described in detail.

DETAILED DESCRIPTION

Figure 1:
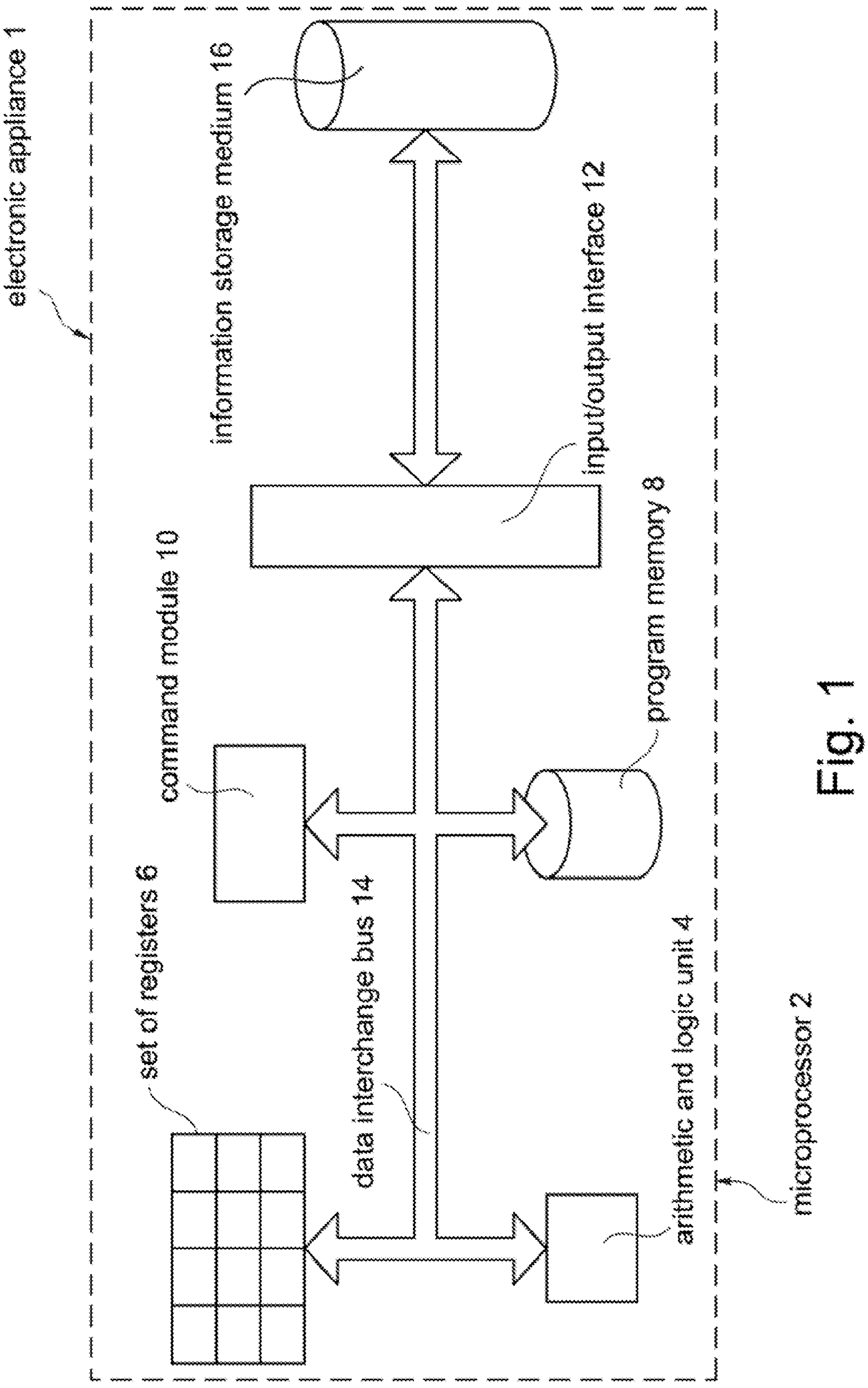
FIG. 1 is a schematic illustration of an electronic appliance comprising a microprocessor and an information storage medium.

FIG. 1 represents an electronic appliance 1 comprising a microprocessor 2 and an information storage medium 16. The microprocessor 2 includes an arithmetic and logic unit 4; a set of registers 6; a program memory 8; a command module 10; and a data input/output interface 12.

The memory 8 is configured to store instructions that have to be executed by the unit 4. Typically, the ordinal counter of the microprocessor 2 points to this memory 8. The unit 4 is configured to execute the instructions stored in the memory 8 in the order in which these instructions are stored in the memory 8, and, where appropriate, to store the result of these executed instructions in one or more of the registers 6. Here, it is considered that an instruction to be executed by the unit 4 has to be placed in the memory 8. As used herein, the phrases "execution by the microprocessor 2" and "execution by the unit 4" will mean the same thing.

The module 10 is configured to shift instructions between the registers 6, the memory 8, and the interface 12. To this end, the microprocessor also has a data interchange bus 14. The interface 12 is notably suitable for acquiring data, for example from the medium 16 external to the microprocessor 2. In some embodiments, the medium 16 is a non-volatile memory, such as an EEPROM or Flash memory.

Such a microprocessor 2 is well known to those skilled in the art and will not be described in detail. In one embodiment, the microprocessor 2 is the MSP430 microprocessor marketed by the company "Texas Instruments".

Figure 2:
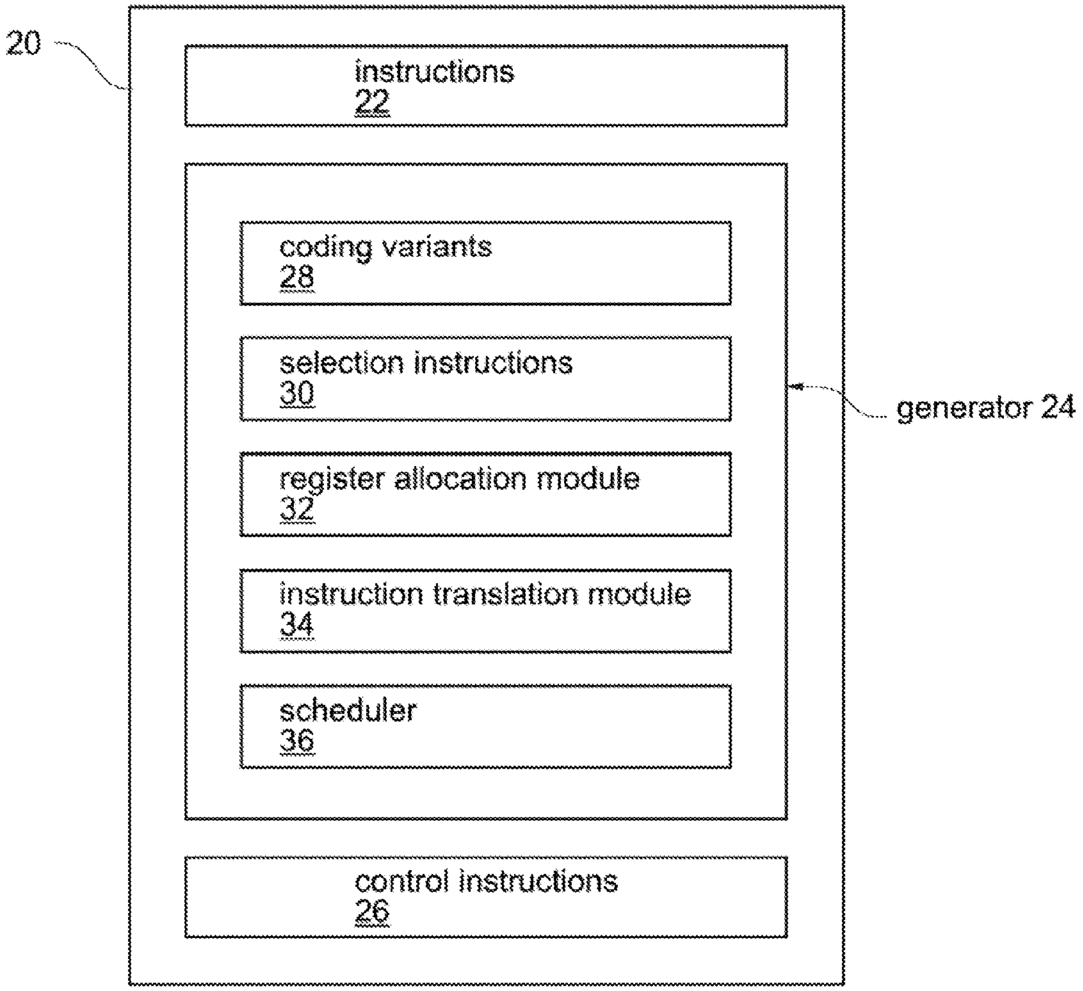
FIG. 2 is a schematic illustration of polymorphic binary code stored on the storage medium suitable for execution by the microprocessor of FIG. 1.

FIG. 2 represents a polymorphic binary code 20 of a predetermined function intended to be executed by the microprocessor 2. This code 20 comprises a succession of instructions suitable for execution by the microprocessor 20. This code 20 is stored on the medium 16. Thus, this code 20 can be characterized by examining the instructions stored on the medium 16.

As used herein, a "program" denotes a set of one or more predetermined functions that are to be executed by the microprocessor 2.

As used herein, "source code" is a representation of the program in a computer language that is not directly executable by the microprocessor 2 and that is intended to be converted into instructions by a compiler.

As used herein, a program or a code is said to be "directly executable" when it is suitable for execution by a microprocessor without the microprocessor first needing to compile it with a compiler or to interpret it with an interpreter.

As used herein, an "instruction" denotes a machine instruction executable by a microprocessor. Such an instruction includes an opcode, or operation code, coding the nature of the operation to be executed, and one or more operands defining the value or values of the parameters of this operation.

As used herein, "binary code" is a set of machine instructions. It is typically a file containing a succession of bits having the value "0" or "1", these bits coding the instructions to be executed by the microprocessor. The binary code is directly executable by the microprocessor, without requiring prior compilation or interpretation.

As used herein, "execution of a function" is used to denote the execution of the instructions performing this function.

For the purposes of simplicity, in this description, these instructions are not represented systematically in binary form, but rather in a symbolic form expressed in a machine or assembly language. In particular, the opcode is represented in a known manner by a mnemonic.

More specifically, the code 20 comprises: a block of instructions 22 to obtain a random number; at least one block of instructions, called a specific generator 24, that is suitable for generating, when it is executed by the microprocessor 2, only one set of instructions, called target instructions, the performs the predetermined function when those instructions are executed by the microprocessor 2, and a block of instructions, called control instructions 26, suitable for placing, in the memory 8, the set of target instructions generated by the generator 24.

The block 22 comprises, for example, the reading of a source of pseudo-random numbers. To simplify the description, this source uses the routines for the generation of pseudo-random numbers located in the system libraries of a POSIX system, as supplied by the routine "rand( )" of the header file "stdlib.h" of the C standard library. First, the random number generator "srand( )" is initialized with a predefined seed "ALEA_SEED". In the simplified case described here, the block 22 supplies as a result the value of a pseudo-random integer number greater than or equal to 0 and less than or equal to the value "RAND_MAX" defined in the header file "stdlib.h".

The generator 24 comprises: a block of instructions coding a plurality of coding variants 28 of the predetermined function; selection instructions 30; a register allocation module 32; an instruction translation module 34; and an instruction scheduling module 36, hereinafter called "scheduler 36".

The instructions of the modules 32, 34 and of the scheduler 36 can be located in the generator 24 or outside it. If the instructions of the modules 32, 34 and of the scheduler 36 are situated outside, then the generator 24 includes a return to these instructions. The return is, for example, performed with a "JMP" instruction in machine language.

Each of the coding variants 28 generates, when it is executed by the microprocessor 2, a specific set of target instructions performing the predetermined function. Each coding variant 28 is thus suitable for producing a specific set of instructions that is different from the set of target instructions generated by the other coding variants but which are all functionally equivalent. Two sets of instructions are said to be functionally equivalent if, when executed by the microprocessor, they produce the same result from the same input data. Each of these specific sets of target instructions is distinguished from the others by at least: a different opcode, or a different literal value, or a different number of instructions.

The instructions 30 make it possible to choose, from the plurality of variants 28, as a function of the random number acquired by the execution of the instructions 22, a coding variant to be executed to generate a specific set of target instructions which will form the set of target instructions.

The module 32 is a block of instructions configured to allocate, when it is executed by the microprocessor 2, one or more registers of the set 6 for the execution of instructions on the unit 4. Such a module 32 is known. The module 32 performs this assignment as a function of a value of a random number. For example, the module 32 comprises instructions suitable for modifying, as a function of the value of the random number, the value of an operand of an instruction corresponding to the identifier of a memory register of the set 6. To achieve this, the module 32 comprises a block of instructions for acquiring a value of a random number. For example, the module 32 is performed by implementing the functionalities of the register renaming method described in the document WO 02/054228 A1. As an example, the module 32 associates a register "r5" of the set 6 with a register identifier "A" if the value of the random number is even and, if not, it associates it with a register "r9".

The module 34 is a block of instructions configured to generate the target instructions from coding variants 28.

The scheduler 36 is a block of instructions configured to modify, as a function of a random number, the order in which the target instructions have to be executed by the unit 4. This scheduler 36 receives as input: a value of a random number, and one or more instructions generated by the module 34 and to which the module 32 has assigned one or more registers 6.

The scheduler 36 supplies, as output, the target instructions in the order in which they have to be executed by the microprocessor 2. These target instructions are then stored by the scheduler 36 in the memory 8.

For example, the scheduler 36 automatically places these received instructions in a queue and inspects them one after the other to determine scheduling modifications that are possible while retaining the semantic dependences that may exist between these instructions. In this example, the queue is a circular queue comprising a plurality of positions and two markers, respectively called "head" and "tail." The positions of the queue are ordered, and each position of the queue is suitable for storing an instruction. The head marker denotes the first instruction of the queue and the tail marker denotes the position following that of the last instruction of the queue. The queue is stored in a memory of the microprocessor 2. For each instruction stored in each position of the queue, the scheduler 36 is suitable for storing: the defs" registers in which this instruction writes, and the "uses" registers that are read by this instruction.

When the scheduler 36 receives an instruction from the module 34, it places it in the queue. The scheduler 36 functions as follows: first, the head and the tail are initialized and each denotes the first position of the queue. Then, for each of the instructions supplied to the scheduler by the module 34, the following steps are performed:

If the queue is not empty and the head and tail markers denote the same position, then this means that the queue is full. The first instruction in the queue is then emptied by placing the instruction contained in the head position in the memory 8; and incrementing the position of the head. In particular, the position of the head is incremented, or shifted by one position from its current position. The position continues to be incremented as long as the position following that of the head contains no instruction.

if the queue is not full, then: the instruction supplied by the module 34 is inserted at the queue tail; a random number is acquired. If the value of this random number is strictly less than the size of the queue, then it is stored in a variable, here denoted "h". Otherwise, random numbers are successfully acquired until this condition is met; as long as "h" is not zero and the result of the dependency test defined herein is false, then the instruction supplied is shifted in the queue by one position towards the head of the queue; and the value of "h" is decremented. Finally, the position of the tail marker is incremented.

The dependency test returns the logic value "true" if one of the following conditions is satisfied, and returns the logic value "false" otherwise:

- the instruction supplied has at least one "defs" with the "defs" of the instruction situated in the immediately preceding position in the queue;
- the instruction supplied has at least one "uses" in common with the "uses" of the instruction situated in the immediately preceding position in the queue.

Figure 3:
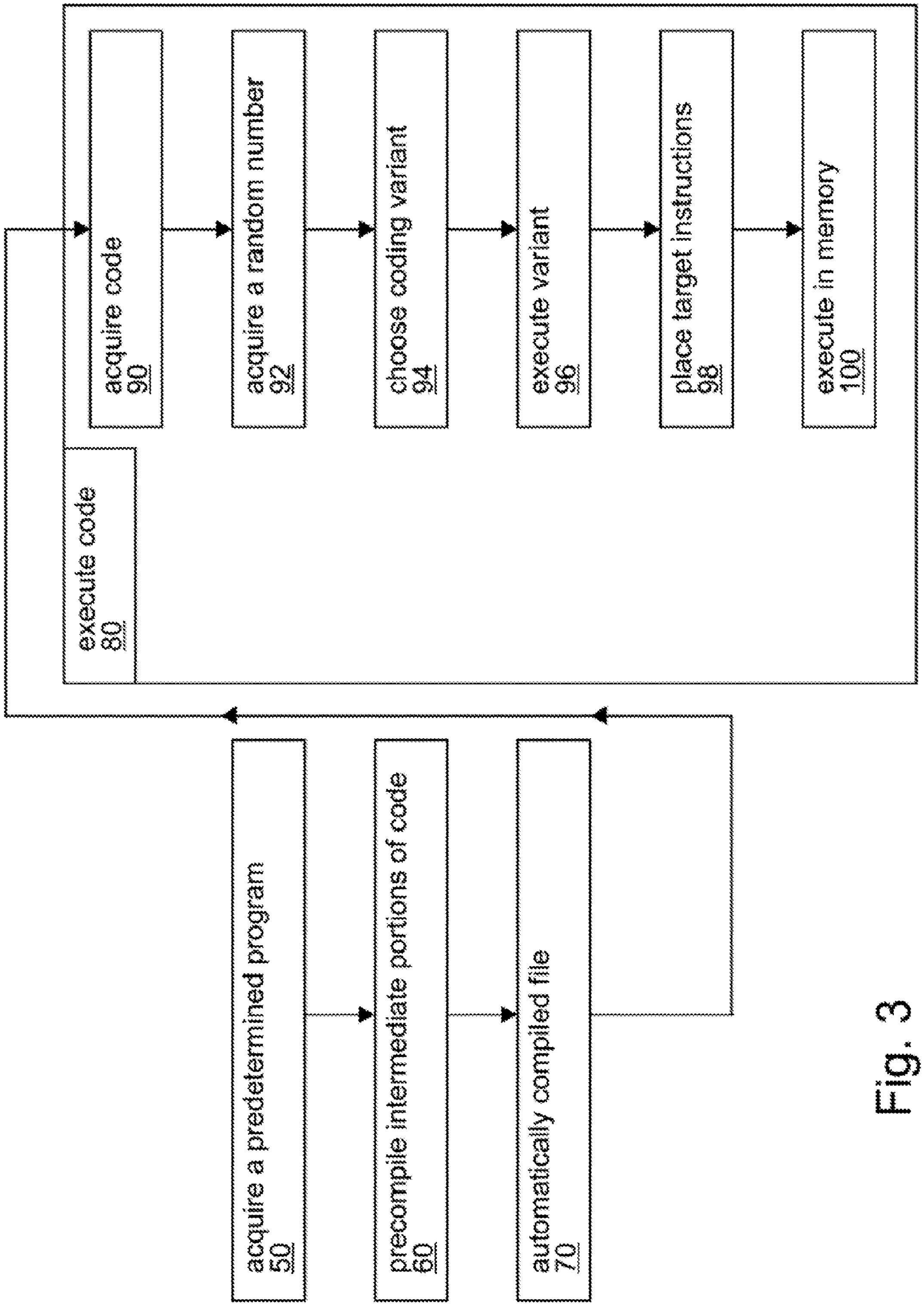
FIG. 3 is a flow diagram of methods for constructing and then executing the polymorphic binary code of FIG. 2.

An example of the modules 32, 34 and of the scheduler 36 will be described in more detail with reference to the method of FIG. 3.

For example, this code 20 is constructed using a modified version of the "deGoal" software developed by the inventors. This "deGoal" software makes it possible to create a polymorphic binary code generator. The principle of operation of this software is described in Henri-Pierre Charles, "Basic infrastructure for dynamic code generation", workshop "Dynamic compilation everywhere", 7th HiPEAC conference, January 2012, and in Damien Courousse et al, "Dynamic code generation: an experiment on matrix multiplication", Proceedings of the work-in-progress session, LCTES 2012, June 2012.

[In the foregoing articles, the generator 24 is designated by the term "compilette" and the set of target instructions is designated by the term "kernel".

The "deGoal" software is however modified in such a way that the generation of the code does not depend on data supplied as input for the predetermined function to be executed, and depends on one or more random numbers.

An example of generation of the code 20 will now be described in more detail with reference to the flow diagram of FIG. 3 and using FIGS. 4 to 7.

For example, a computer includes the "deGoal" software modified in the manner mentioned previously, which will be named precompiler, and a compiler.

This modification of the "deGoal" software does not fundamentally alter the method for constructing a code by means of this "deGoal" software. Thus the steps of constructing the code 20 will not be described in detail. Descriptions of basic functionalities of the "deGoal" software for constructing a polymorphic binary code are described in its documentation, which includes, for example, the "deGoal" software manual by Pierre-Henri Charles, "DeGoal Documentation: Dynamic Execution of Generated Optimized kernel from Algorithmic Level", 2013. A copy of this manual, the content of which is herein incorporated by reference, is supplied in the appendix to this description.

During a step 50, a predetermined program that has to be executed is acquired automatically by the computer.

The predetermined program comprises a cryptographic primitive that is to be executed on the microprocessor 2 so as to safeguard against the side channel cryptological attacks. This primitive comprises the encryption algorithm known by the name "Advanced Encryption Standard" (AES). FIG. 4 represents an extract 52 of this program. More specifically, FIG. 4 represents the implementation of a step of this program, as proposed by Mangard et al., in the work "Power analysis attacks: revealing the secrets of smart cards", Vol. 31, Springer-Verlag New York Inc., 2007 (Figure B.10 of this work). This extract 52 is here expressed in the form of instructions in machine language for a generic microprocessor of 8051 type. However, at this stage, the code 20 corresponding to this extract 52 is not yet constructed in binary form.

The numbers situated on the left of FIG. 4 are the numbers of the lines of the file to which reference is subsequently made. These line numbers do not form part of the instructions. The same applies for FIGS. 5 to 10.

The comments situated after the ";" character on the lines of the file of FIG. 4 do not form part of the instructions.

To simplify the description, the generation of the polymorphic code is only described in detail for the instructions of lines 1 to 5 of FIG. 4. The generation of the polymorphic code for the other lines of the program is deduced from the explanations given for these lines 1 to 5. The functions of these lines 1 to 5 therefore here form a set 54 of predetermined functions.

In the illustrated embodiment, each predetermined function corresponds to an instruction in machine language. As is known, this set 54 performs the first four operations of a "turn" of the AES algorithm. More specifically, this set performs an addition between an element a0 (denoted "ASM_input" in the machine language) of a first matrix and an element k0 (denoted "ASM_key" in the machine language) of a second matrix. The numeric value of the element a0 is loaded into a register A of a microprocessor, then the numeric value of the element k0 is added thereto. The set 54 is here implemented by the following four functions:

- loading the numeric value of the variable a0 in a register A of a microprocessor;
- applying the logic operation XOR between the numeric value of the variable k0 and the numeric value stored in the register A;
- loading the result of this operation in the register A, then
- loading the value contained at the address contained in the register A added to the value DPTR in the variable a0, DPTR indicating the address S-box constants table ("S-box table"), illustrated in Figure B.5 of the work by Mangard et al. cited previously.

It should be noted that it is purely a matter of a generic description of the set 54 to define its functionality. The form of the specific set of instructions used to perform these functions of the set 54 will be known only at the time of execution of the set 54 by the microprocessor 2.

In the example, the set 54 is first acquired in the form of source code. Here, for this, a file 56 containing the source code of this set 54 is acquired automatically by the computer.

FIG. 5 illustrates in detail an example of the source code contained in the file 56. Here, the source code contains portions of code in C language and so-called intermediate code portions written in an intermediate language. This intermediate language is suitable for transcription into C language in the form illustrated in FIG. 6, which is suitable, in turn, for compilation to form the code 20. The functions described in this intermediate language can be parameterized as a function of variables whose values are not known at the time of compilation but that will be known at the time of the execution of the code 20. The functions of the set 54 are entirely and uniquely encoded in this intermediate language.

The C language is defined by the ANSI standard as is known to those skilled in the art.

In the illustrated embodiment, the intermediate language is the "cdg" language. A more precise description of the "cdg" language and of its syntax is supplied in the previously cited documentation for the "deGoal" software and will not therefore be repeated in detail here.

The portion of code in cdg language in the file 56 is delimited by the delimiters "#[" and "]#". This portion of code here comprises:

- the definition of the variables of the functions of the set 54 (line 3);
- the definition of the address, here contained in the "code" variable, from which the processor instructions will be written by the code generator (line 3);
- the definition of the type of the variables (line 4);
- the definition and the allocation of a microprocessor register for the execution of the function 54 (line 5), and
- the definition of the four functions of the set 54 (lines 7 to 11) previously itemized.

The line portions beginning with the character "//" in the file of FIG. 5 are comments that can be omitted.

In the illustrated embodiment, the variables are:

ASM_input, which corresponds to the memory address of the variable a0;

ASM_key, which corresponds to the variable k0;

DPTR, a pointer to a register of the microprocessor; and an internal variable A, corresponding to a register of the microprocessor.

At this stage, the respective numerical values of these variables are not yet known.

The functions of the set 54 are here defined from the operations defined in the extract 52 by using expressions, in cdg language, corresponding to machine instructions that can be executed on the microprocessor 2. For example, the expression "add A, #(ASM_key+0)" on line 8 of this file 56 corresponds to the function defined in line 2 of the extract 52, that is to say the application of the XOR logic operation between the numeric value of the variable k0 and the numeric value stored in the register A.

During a step 60, the intermediate portions of code are automatically precompiled by a precompiler to be converted into C language suitable for conversion in turn, into machine instructions by a compiler. Here, this precompiler is the "deGoal" software modified as previously described. In this example, this precompiler takes as input the acquired file 56 then transforms each portion of code written in cdg language in the file 56, here delimited by the symbols "#[" and "]#", into C language code respectively implementing each portion of code in cdg language.

FIG. 6 represents an exemplary file 62 derived from this precompilation, or translation, of the file 56. This file includes calls to routines written in C language that implement the functionalities of the portion of cdg code of the file 56. In it, each of the expressions in cdg language corresponding to the four functions of the set 54 are transcribed by corresponding routines.

Each of the routines of the lines 4 to 12 of the file 62 correspond to source code of a specific code generator that is suitable for generating, when the corresponding binary code is executed by the microprocessor 2, target instructions performing the corresponding function of the file 56. These routines are defined in another portion of the source code, like the library "cdg-msp430.h".

For example, the routine 64 "CDGgenadd_ri(A, (ASM_key+0)" corresponds to the source code of the generator 24. In this example, the generator 24 is suitable for generating a set of target instructions to perform the predetermined function "add A, #(ASM_key+0)" of the file 56, which itself corresponds to the operation "XRL A, ASM_key+0" of the extract 52.

Similarly, the routines of lines 8, 10 and 11 correspond to the source codes of other specific generators suitable for generating the specific sets of instructions performing, respectively, the predetermined functions of lines 1, 4 and 5 of the extract 52.

It should be noted that at this stage, the code 20 has not yet been created. However, to simplify the description, the components of the code 20 are described with reference to the expressions in C language of the file 62, rather than to the machine instructions forming the code 20. In effect, the description of a function in C language has a more compact form and is easier for a human being to read than a description of this same function in corresponding machine instructions.

FIG. 7 shows, in more detail, the routine 64 and therefore the source code of the generator 24, notably on lines 4 to 26. To simplify the exposition, the other routines are not described in more detail. Explanations concerning their operation are available in the abovementioned "deGoal" software documentation and the modifications to be made for them to generate specific sets of target instructions as a function of a random number can be deduced from the explanations below.

The routine 64 accepts, as input the variables, "rdest" and "immediateVal". These correspond, respectively, to the values of the variables "A" and "ASM_key" previously defined. Execution of the routine 64 generates a set of target instructions in the order in which they will be executed by the unit 4.

This routine 64 comprises: the call to the function "srand( )", for the initialization of the pseudo-random generator as a function of the seed "ALEA_SEED"; instructions for the acquisition of a random number (line 7), represented by the procedure "rand( )"; a first coding variant 66 and a second coding variant 68 of the predetermined function, and instructions 30 for choosing a coding variant to be executed from these variants.

The instructions 30 are supplied by the conditional structure "if/then/else" of lines 9 to 24 for which the condition is the parity of the random number acquired. These instructions 30 are suitable for choosing the first coding variant or the second coding variant depending on whether the value of the random number is even or odd.

The coding variant 66 generates, when it is executed by the microprocessor 2, the machine instruction "ADD A, ASM_key+0" and transmits this generated instruction to the scheduler 36. The scheduler 36 inserts the machine instruction into the memory 8 and, if necessary, modifies the order of execution of this instruction, as previously described, relative to the other target instructions, as a function of a value of a random number.

To do this, a "schedule instruction" procedure is called, supplying it with the parameters "add_ri", "rdest" and "immediateVal". This procedure comprises the module 34, which is suitable for generating an instruction from a parameter supplied, and the scheduler 36. The "schedule instruction" procedure is defined in the "deGoal" software.

The parameter "add_ri" indicates to the translation module 34 that the instruction having to be generated is the instruction bearing the opcode "ADD".

Similarly, the correlation between the opcode "ADD" and the parameter "add_ri" is previously defined in the module 34 in a portion of the code not represented here.

The parameter "rdest" is an identifier of a memory register of the set 6, and the parameter "immediateVal" is a numeric value.

The coding variant 68 generates, when it is executed by the microprocessor 2, a set of target instructions in which the addition operation is separated into two distinct addition operations. This separation comprises the use of an intermediate register "rtmp" and of an intermediate value "k", which depends on a random number. Thus, the intermediate register "rtmp" is allocated, and the following instructions are generated then placed by the scheduler 36 in the memory 8:

"MOV rtmp, k";

"ADD A, rtmp";

"ADD A, (ASM_key+0−k)".

To do this, the procedures "rand( )", "allocateRef( )", and "schedule instruction" of the routine "CDGgenadd_ri" are executed, with "schedule instruction" being executed thrice as described below.

The procedure "rand( )" obtains a new value of the random number, that is assigned to the "k" variable, distinct from the value "alea" (line 14). Only the four low order bits of the value supplied by the procedure "rand( )" are used, after application of the binary mask 0xFFFF using the logical "AND".

The procedure "allocateReg( )" executes the module 32 so as to allocate the temporary register "rtemp" to one of the registers of the set 6 (line 15).

The procedure "schedule instruction" is called three times, during which it is respectively supplied the following parameters:

"mov_ri", "rtmp" and "k" (line 18);

"add_ri", "rdest" and "rtmp" (line 21);

"add_ri", "rdest" and "(immediateVal−k)" (line 24).

In the above parameter list, the parameter "rtmp" is an identifier of a memory register of the set 6. The parameter "mov_ri" indicates to the translation module 34 that the instruction having to be generated is the instruction bearing the opcode "MOV". The parameter "add_ri" indicates to the translation module that the instruction that has to be generated is the instruction bearing the opcode "ADD" but whose operands are identifiers of memory registers of the set 6.

Multiple random numbers are thus accumulated: in one of the operands of one of the addition instructions, in the assignment of the intermediate register "rtemp", and in the scheduling of the instructions by the scheduler 36.

The choice of the variant to be executed is only possible between coding variants defined in the generator 24. There is therefore no need to enter, as an argument for the generator, an identifier of the predetermined function, as is the case in the method described in the abovementioned article by Agosta et al. for the standardization step of that method.

Referring again to FIG. 3, during a step 70, this file 62 is automatically compiled to form the binary code 20. This compiler is notably configured to convert ANSI C code into machine instructions that can be executed on the microprocessor 2. For example, this compiler is the "gcc" version 4.6.3 compiler configured to be compatible with the architecture of the microprocessor 2. Furthermore, the C language code derived from the precompilation is placed in one and the same file as the C source code that was initially acquired during the step 50 in such a way that they are compiled together during one and the same compilation operation.

The binary code 20 is then executed automatically by the microprocessor 2 during a step 80. An example of execution of the code 20 will now be described in detail, with reference to the flow diagram of FIG. 3 and using FIGS. 4, 7 and 8. The execution of this code 20 is described for the functions of the set 54 and, more specifically for the function of line 2 of this set.

During an operation 90, the code 20 is automatically acquired by the microprocessor 2. For example, the module 10 loads this code from the medium 16 through the interface 12 to a volatile memory space, then loads the instructions of this code 20 into the memory 8 for the unit 4 to execute them in the order in which they appear. Thus, the specific generators of the predetermined functions of the set 54 are executed in turn. To simplify, only the execution of the generator 24 will be detailed. The execution of the generator 24 causes the microprocessor 2 to execute the following operations.

In an operation 92, the execution of the block 22 of instructions corresponding to line 11 of FIG. 7 leads the microprocessor 2 to acquire a random number. The instructions of the block 22 correspond to the function "rand( )". This acquired random number is stored in an internal variable, here denoted "alea", and stored in a memory of the microprocessor 2.

Then, in an operation 94, by executing the instructions 30, a coding variant to be executed is chosen automatically as a function of the value of the previously acquired random number. In this example, the "alea" value is even. As a result, coding variant 66 is chosen.

Next, in an operation 96, the variant 66 is automatically executed. This generates the set of target instructions for performing the predetermined function of line 2 of the set 54.

Next, in an operation 98, the set of target instructions thus generated is placed, by execution of the scheduler 36, in the memory 8 to be executed by the unit 4 in an operation 100.

The operations 96 and 98 are performed by executing the instructions that correspond, in the source code of FIG. 7, to the procedure "scheduleInstruction(add_ri, rdest, immediateVal)", in which the variables "rdest" and "immediateVal" are respectively assigned values of the variables "A" and "(ASM_key+0)" (as indicated in FIG. 6). This procedure places in the memory 8 an instruction "ADD" that has for operands the register "A" previously associated with one of the registers of the set 6 and the numeric value "(ASM_key+0)". The operation 98 is performed upon the placement of this operand in the queue of the module 36.

Figure 8:
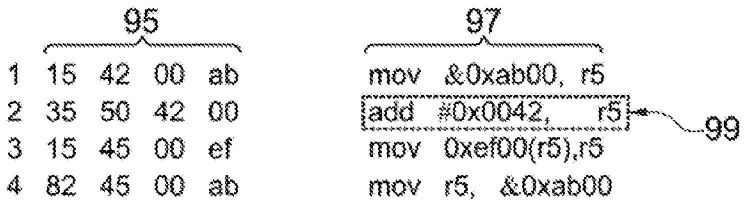
FIGS. 8 to 10 illustrate target instructions generated by the specific code generator.
Figure 9:
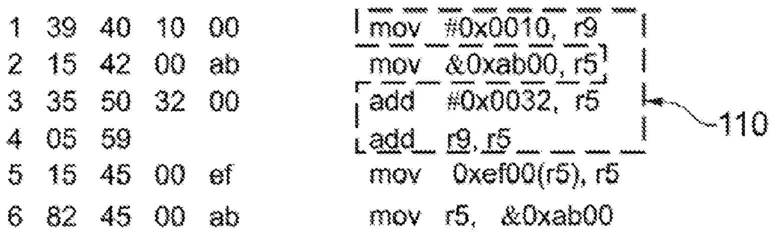
Figure 10:
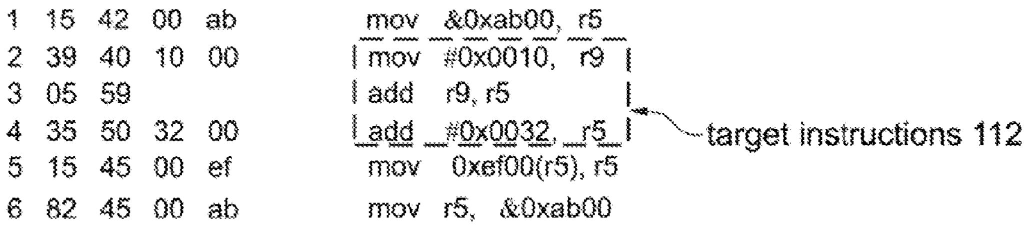

FIGS. 8 to 10 represent three specific sets of instructions generated for the four functions of the set 54 during three successive executions of the binary code 20 by the microprocessor 2. The parts 95 and 97 respectively represent the binary code in hexadecimal as it is stored in the memory 8 of the processor 2, and the code in machine language of the instructions generated. These three executions of the binary code 20 are performed with the same input data. In this example, the variables "ASM_input", "ASM_key" and "DPTR" respectively have the numeric values, in hexadecimal notation, "0xab00", "0x0042" and "0xEF00". Furthermore, during these executions of the code 20, the register assigned to the variable A is the register "r5" of the set 6. In the examples of FIGS. 8 to 10, the operands of the instructions show an order that is different from the order of the operands of the instructions described with reference to the figures, notably 4 to 6. This difference in order arises from the specific syntax of the MSP430 microprocessor instruction set, which is different from the generic syntax used previously.

FIG. 8 represents the set of instructions generated in the first execution. During this first execution, the value of the random number is even. The instruction 99 more particularly represents the instruction generated by the execution of the generator 24 and of the variant 66. The instruction 99 is therefore written "add #0x0042, r5".

FIGS. 9 and 10 represent the sets of target instructions generated by the generator 24, during the second and third executions of the code 20 by the microprocessor 2. During these second and third executions, it is assumed that the value of the random number is odd. It is therefore the execution of the variant 68 that generates the specific set of target instructions each time. Furthermore, it is assumed that, during these two executions, the value of the random number denoted "k" in FIG. 7 is equal to "16", or "0x10" in hexadecimal notation. It is also assumed that the register "rtmp" of FIG. 7 is associated with the register "r9" of the set 6 by the execution of the routine of line 19 of FIG. 7.

In FIG. 9, the target instructions are identical to those of FIG. 8, except that the instruction 99 is replaced by a set 110 of target instructions. These instructions are different in form but are functionally equivalent to the instruction 99. The instruction 99, which consisted in adding the instantaneous value "0x42" to the value contained in the register "r5", is replaced by the following instructions of lines 1 and 3 to 4:

add the value "0x10" to the value stored in an intermediate register "r9" of the set 6;

add the value "0x32", obtained by subtracting the value "k" from the value of "ASM_key", to the value stored in the register "r5";

add the value stored in the register "r9" to that stored in the register "r5".

In other words, instead of doing the addition "r5:=r5+0x42", the set 110 does the operations "r9:=0x10", "r5:=r5+0x32" then "r5:=r9+r5" (where ":=" symbolizes the operation of assignment to a register). In this example, the instructions of the set 110 are not consecutive in the memory 8. This is caused by the fact that here, the scheduler 36 has modified the order of the instructions contained in the memory 8, notably by inserting the instruction of line 2 between two instructions of the set 110. This instruction of line 2 corresponds to the predetermined function of line 1 of FIG. 4 and has been previously generated by a specific generator contained in the code 20.

In the example of FIG. 10, the set 112 of target instructions generated by the generator 24 is identical to that of FIG. 9. However, this time, the execution of the scheduler 36 has led to a scheduling of the instructions of the set 112 which is different. Here, lines 1 and 2 have been swapped over by comparison with the case of FIG. 9. These target instructions still correspond to the second coding variant, but the order in which they are executed has been modified by the module 36, as a function of a random number.

Thus, the selection instructions 30 is configured in such a way that the choice of the coding variant is made only from the coding variants of the predetermined function. It is these which are contained in the file of FIG. 7. In fact, the generator 24 comprises only coding variants that are specific to the predetermined function and only to that predetermined function. There is then no requirement to execute the operations of destandardization and searching in a dictionary of equivalences. Nor is it necessary to keep, in memory, a dictionary of equivalences that would contain coding variants of another function. The computational resources needed to execute this code 20 are thus reduced. In particular, the number of computation cycles and memory resources used is less than it would be using known methods.

Furthermore, as has been seen with the examples of FIGS. 8 to 10, the combination of additional random numbers in the operation 96 makes it possible to generate a large number of variant target instructions with only a reduced number of coding variants. in this case, only two coding variants in the file of FIG. 7.

In particular, the inventors have determined that the present method requires fewer computational resources than those of the method described by Agosta et al. in the previously cited article. In effect, in the latter, the inventors were able to estimate, from the data of section 4 of that article, that this method requires approximately 187000 computation cycles to generate an equivalent instruction from the dictionary of equivalences. By comparison, the present method requires only 30 to 300 computation cycles to generate a target instruction on the MSP430 microprocessor, the target instruction generation time varying as a function of the target instruction and of the quantity of processing operations for the analysis of the random number. In all cases, for an ARM microprocessor, the architecture of which is close to the trial platform used by Agosta et al., the generation time of the present method is still strictly less than 1000 computation cycles to generate a target instruction. The inventors have further determined that, for the RISC STxP70 processor, and without the polymorphic code generation mechanism described in this invention being used, the dynamic code generation method using "deGoal" on its own requires between 25 and 80 cycles per target instruction.

Thus, it is possible to implement the method on computer systems that have reduced resources, such as embedded systems or chip cards. Such systems typically incorporate microprocessors of simplified design, generally 8 bit or 16 bit, and have a limited memory typically of the order of a kilobit for RAM memory and of the order of ten or so kilobits for non volatile memory. However, these resources are sufficient to implement the methods described herein.

FIGS. 11A to 11D represent embodiments of the execution of code 20 on the microprocessor 2. More specifically, these figures represent the possibilities of temporal synchronization between, on the one hand, the phases of generation of the set of target instructions by the microprocessor 2 (steps 90 to 96) and, on the other hand, the phases of execution of these target instructions by the microprocessor 2 (steps 98 and 100).

In these figures, the horizontal line represents the passage of time. The shaded blocks correspond to execution of the phases of generation of the set of target instructions by the microprocessor 2, whereas the unshaded blocks correspond to the execution of these target instructions by the microprocessor 2.

Figure 11A:
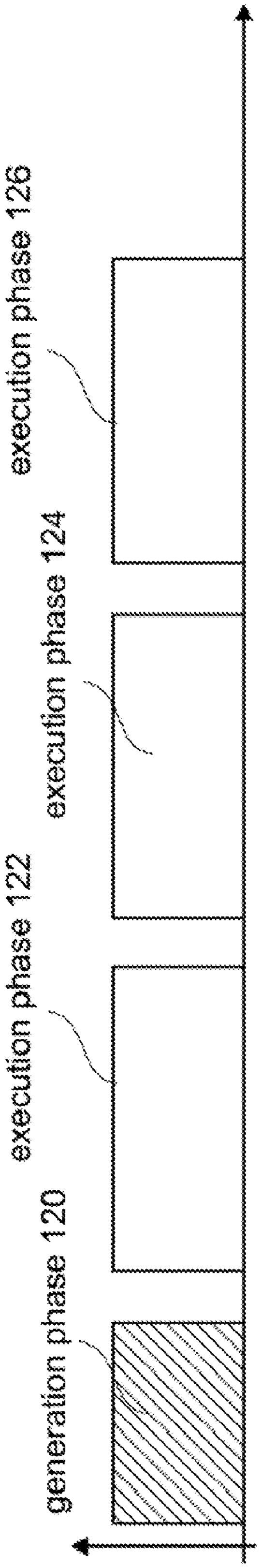
FIGS. 11A to 11D are schematic illustrations of embodiments for synchronization between the operation of the specific code generator of FIG. 2 and the execution of the target instructions generated by this specific code generator.

In the example of FIG. 11A, the generation phase (block 120) is executed first to generate all the target instructions of all the functions of the code 20. Then, the instructions corresponding to these functions are executed one after the other in successive execution phases (blocks 122, 124 and 126). The generation and execution phases are separate. Although this makes it possible to guarantee a rapid execution of the code 20, it may introduce a security fault line linked to the temporal locality of the execution of the code. In fact, when the execution of a set of functions systematically begins with the execution of the code specific generator for these functions, a hacker could identify the time window during which the microprocessor executes the specific generator. This hacker could thus acquire information on the operation of the specific generator.

Figure 11B:
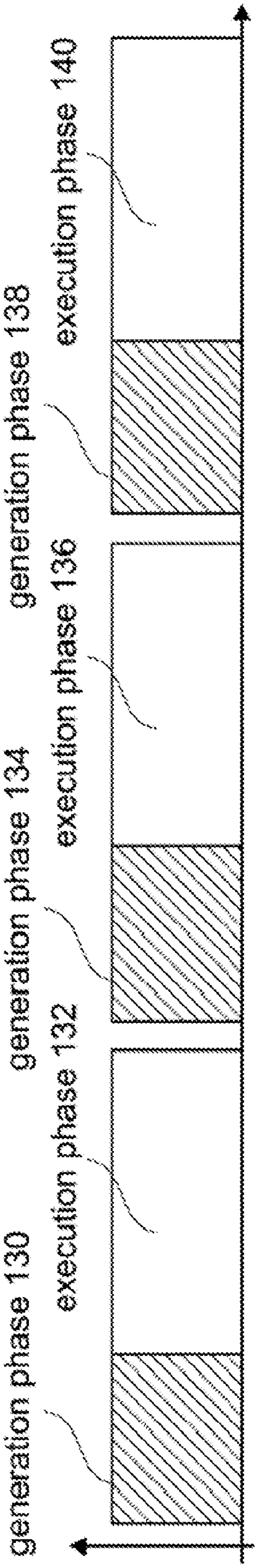
Figure 11C:
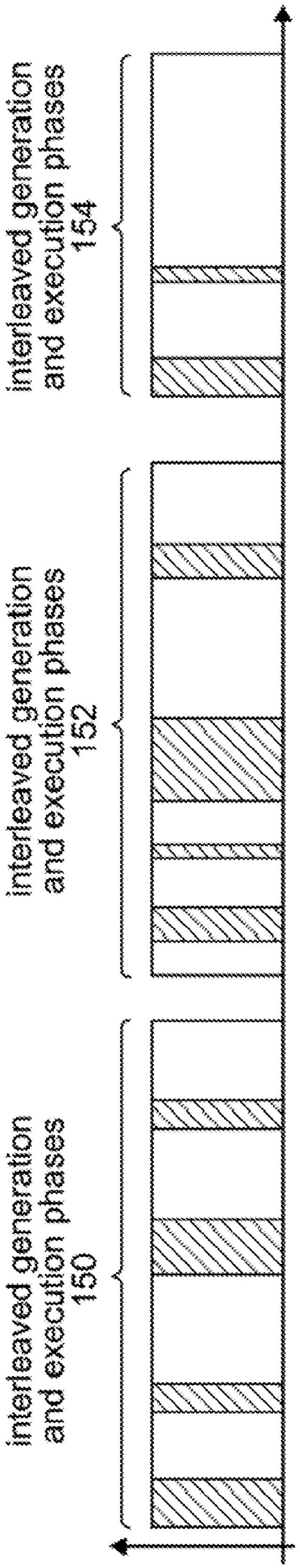
Figure 11D:
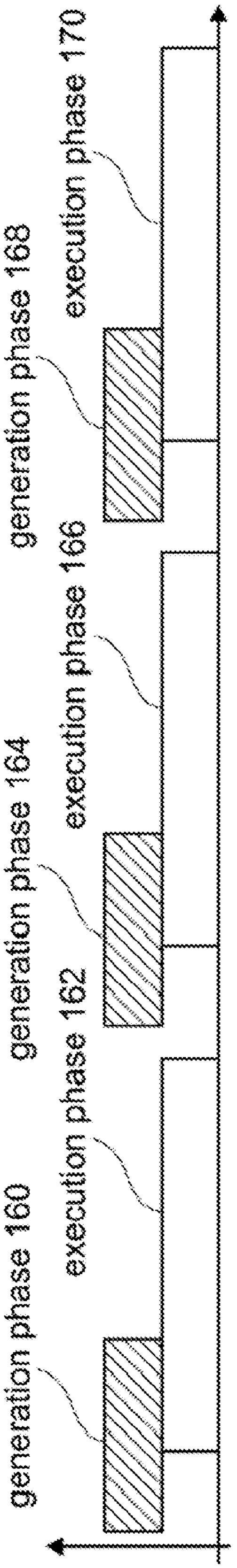
Figure 12:
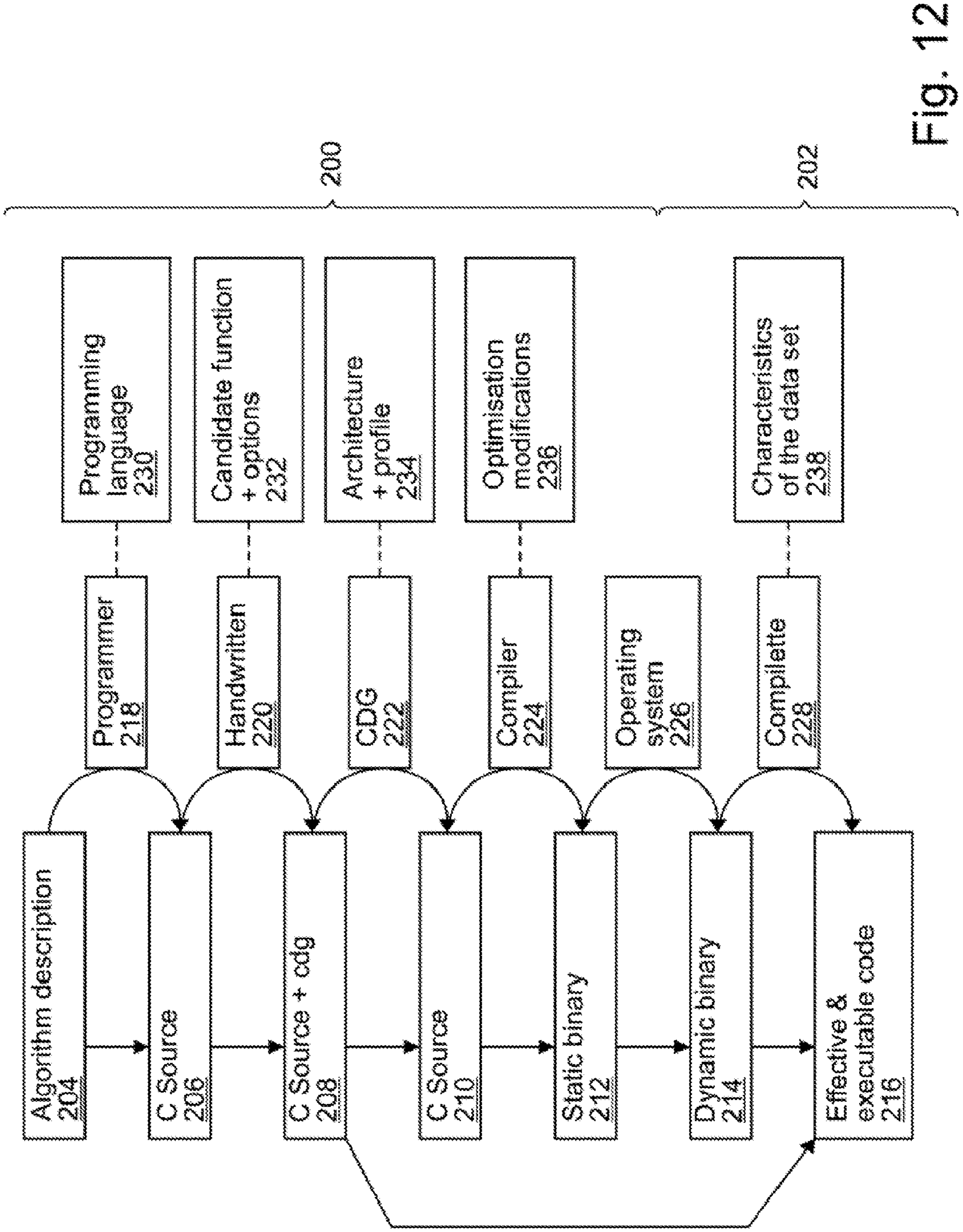
FIG. 12 schematically illustrates a work flow for adding a binary code generator in a program.
Figure 13:
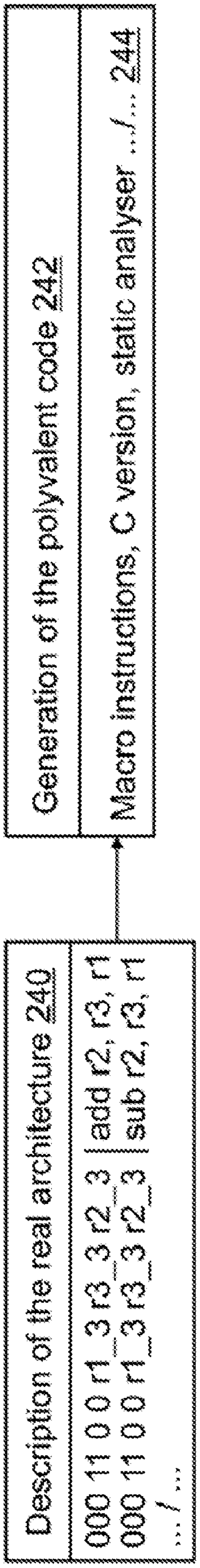
FIG. 13 schematically represents a binary code generator for a compact binary description of an instruction set architecture.
Figure 14:
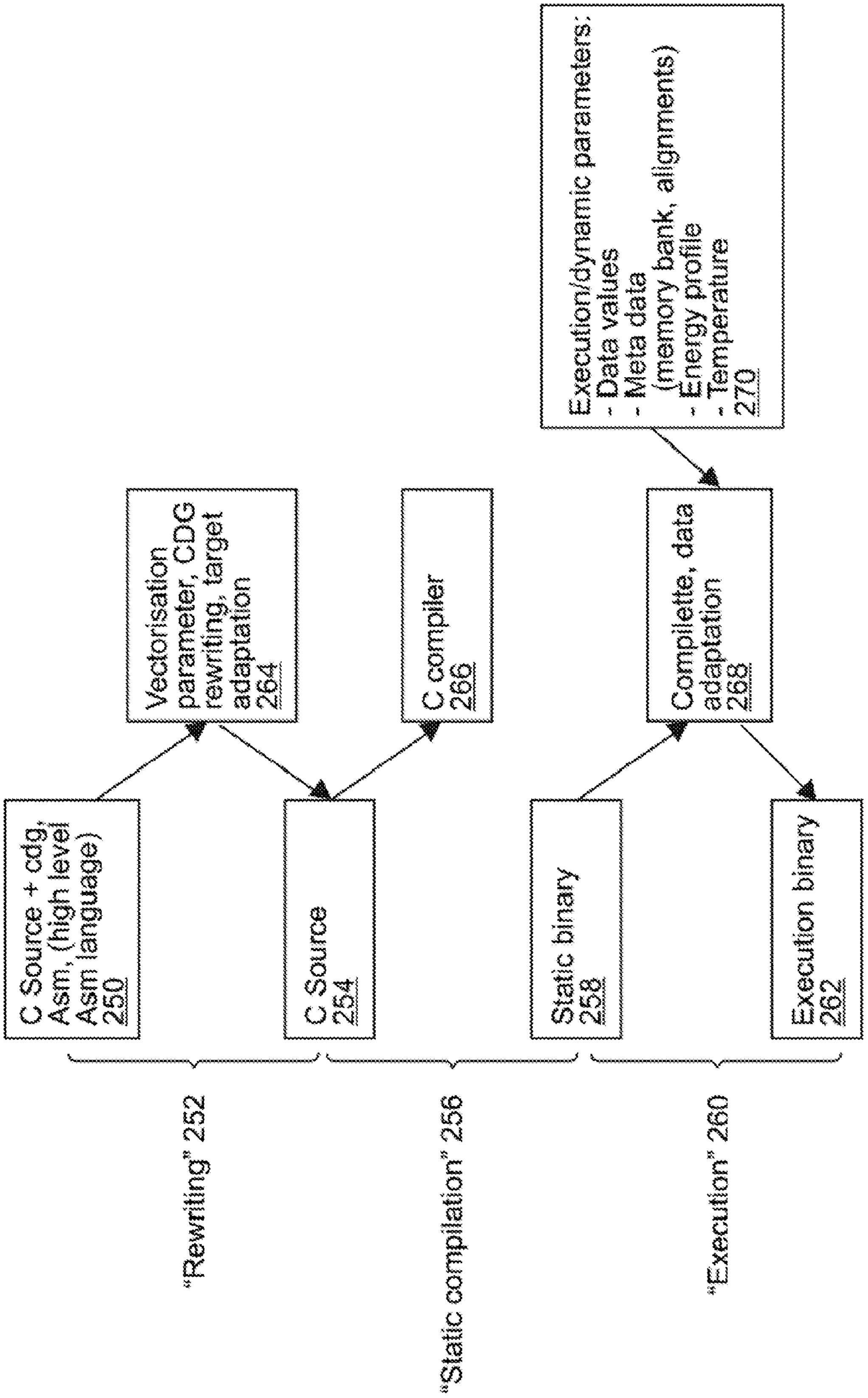
FIG. 14 schematically illustrates a compilette compilation flow.
Figure 15:
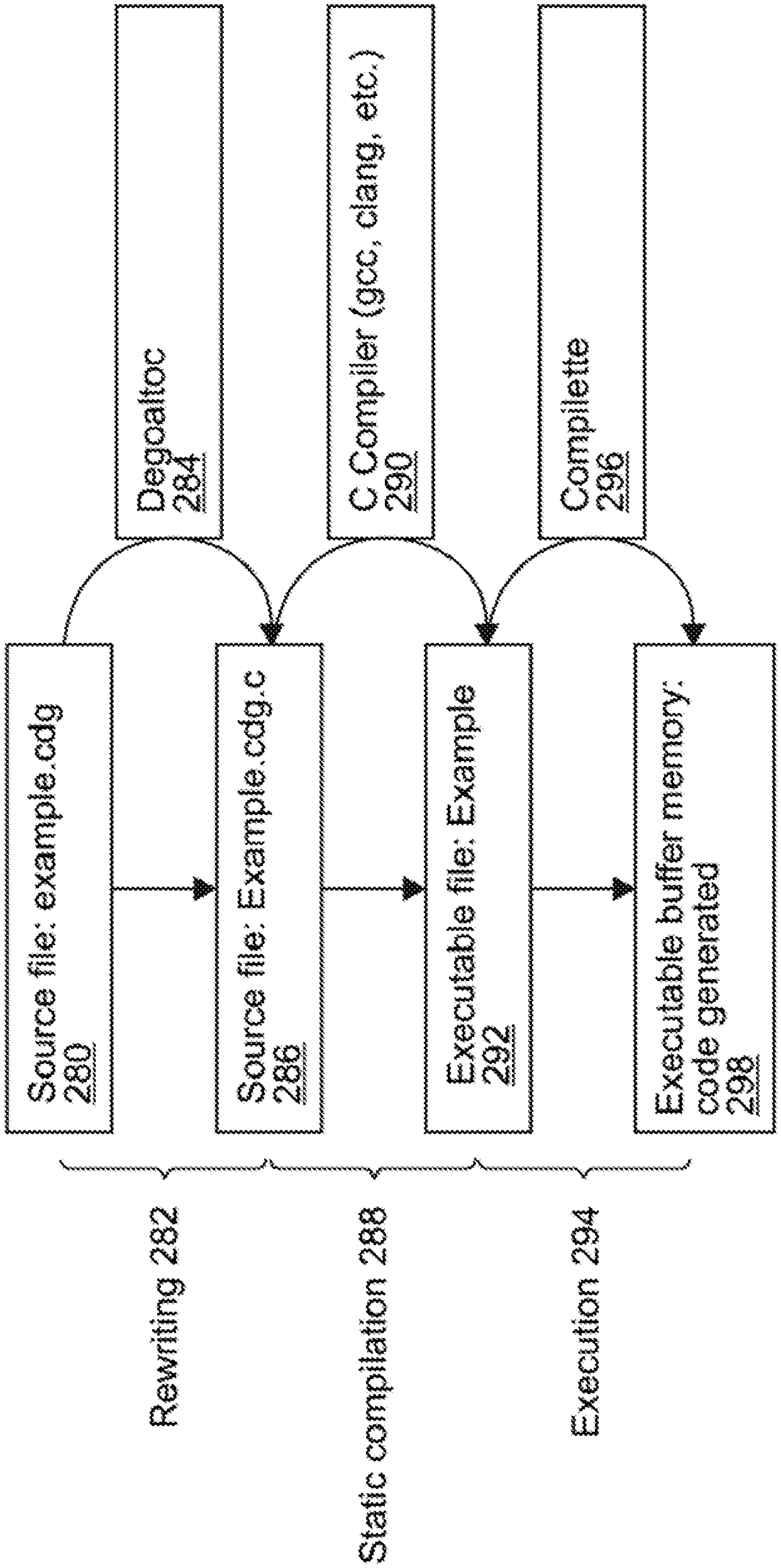
FIG. 15 schematically represents a compilation chain.

The examples of FIGS. 11B to 11D illustrate how to resolve this problem.

[In the example of FIG. 11B, a phase of generation (blocks 130, 134 and 138) is performed before the phase of execution (blocks 132, 136 and 140, respectively) of each of the functions of the program. Thus, in this case, each set of generated target instructions is immediately executed by the microprocessor 2. Inasmuch as the length of the execution phases varies as a function of the random number, a hacker will find it very difficult to determine the ranges of execution of the different execution phases.

In the example of FIG. 11C, for each of the functions, generation phases and the execution phases are interleaved. Thus, the set of target instructions is executed piecewise as it is generated (blocks 150, 152 and 154).

Finally, FIG. 11D represents an embodiment suitable for implementation in the case where the microprocessor 2 has a parallel architecture (for example of the type referred to by the terms "symmetric multiprocessing", "multi core" or "many core"). In this example, for each of the functions of the code 20, the generation phases (blocks 160, 164 and 168)

and the execution phases (blocks 162, 166 and 170, respectively) are performed in parallel by distinct computation units of such a microprocessor.

Numerous other embodiments are possible.

Microprocessor models other than the one described can be used.

As a variant, in some embodiments or practices, the "deGoal" software is replaced by a polymorphic code generator, such as the "GNU Lightning" software available at the web address http://www.gnu.org/software/lightning/, this software nevertheless being modified, in particular to take into account the random number.

The steps 90 to 98 can be performed on a distinct microprocessor or a distinct portion of the microprocessor 2 to that on which the step 100 is performed.

The microprocessor 2 can comprise any number of arithmetic and logic units.

The modules 32, 34 and the scheduler 36 can be performed differently. For example, the scheduler 36 can implement the functions described in the document WO 02/27478 A1 (University of Bristol).

In some practices, the scheduler 36 implements the functionalities of the module described in the abovementioned article by Agosta et al., in section 3 of this article, in the paragraph entitled "Rescheduling".

In some practices, a language other than the C language can be used.

The selection instructions 30 can have a conditional structure that differs from the "if/then/else" type. For example, the selection can be made based on an arithmetical equivalence between two opcodes, for example by the application of a predefined binary mask. As an example, such an equivalence is illustrated here with a simple case in which the opcodes of the instructions are stored on one byte (or 8 bits); the opcode for the integer multiplication instruction is 0x3, and the opcode for the left shift instruction is 0x2. It is then possible to express the multiplication by an integer value that can be expressed in the form $2^n$, in which n is a natural integer, as being a left shift of n bits. Based on a random number "x", it is for example possible to select the opcode of the instruction with the following operation: "opcode=(x & 0x2)", in which "&" denotes the bitwise "AND" operation.

The source code acquired during the step 50 may include functions whose execution by a set of target instructions generated by a specific generator such as the generator 24 is not desired. An example would arise in the case of a program of large size for which the desire is for only a portion to be executed securely on the microprocessor 2. To this end, these functions are described in C language and outside of the intermediate code portions. In this case, only the functions corresponding to this portion are performed by the code 20. The other functions of the program are directly compiled by the compiler in step 70 to generate binary code distinct from the code 20 and directly executable by the microprocessor.

In some practices, the file acquired in the step 50 includes only intermediate code.

The random number can be different. For example, this random number is a true random number. This random number can also be obtained from a hardware source of random numbers. The block of instructions 22 is then modified accordingly. In the case of a cryptological application, the person skilled in the art will be able to adapt this application to the use of a random number generator. In the case of the microprocessor 2 described previously, a person skilled in the art will be able, for example, to use the implementation for the MSP430 processor described in the document "Random Number Generation Using the MSP430", Application Report SLAA338, Texas Instruments, October 2006.

The acquisition of the random number values may be different for the modules 32, 34, 36 and/or for the selection instructions 30. By contrast, one and the same random number value can be acquired and then used by one or more of the modules 32, 34, 36 and/or the instructions 30.

In another practice, the scheduler 36 is configured to be compatible with a "Very Long Instruction Word" microprocessor architecture.

To improve the speed of execution of the code 20, the example of FIG. 11A can nevertheless be implemented for applications for which a slight relaxation of security may be allowed.

In the preceding embodiment, the predetermined function corresponded to a single instruction in machine language. However, in some practices, what has been described previously can also be adopted in the case in which the predetermined function corresponds to a group of several structures in machine language. In this latter case, the specific generator includes different coding variants generating different sets of target instructions functionally equivalent to this group of instructions.

Having described the invention, and a preferred embodiment thereof, what is claimed as new and secured by Letters Patent is:

1. A method of executing, by a microprocessor, polymorphic binary code of a predetermined function, said method comprising providing a microprocessor, wherein said microprocessor comprises one or more arithmetic and logic units, wherein said microprocessor comprises a memory configured to store instructions to be executed by said one or more arithmetic and logic units in a particular order, acquiring polymorphic binary code of a predetermined function, wherein said polymorphic binary code comprises a first block of instructions, wherein said polymorphic binary code comprises a second block of instructions, wherein said first block of instructions comprises instructions that, when executed by said microprocessor, result in acquisition of a random number, wherein said second block of instructions comprises instructions that, when executed by said microprocessor, define a specific generator, wherein said specific generator, when executed by said microprocessor, generates a set of target instructions, wherein said set of target instructions, when executed by said microprocessor, carries out said predetermined function, wherein said polymorphic binary code further comprises control instructions, wherein said control instructions are configured for placing said set of target instructions, which are generated by said specific generator, into memory, wherein placement of said set of target instructions generated by said specific generator into memory occurs in response to execution of said control instructions by said microprocessor, wherein said specific generator incorporates a plurality of coding variants of said predetermined function and selection instructions, wherein each coding variant of said plurality of coding variants generates, when executed by said microprocessor, a specific set of instructions that perform said predetermined function, wherein each instruction of said specific set of instructions comprises an opcode and one or more operands, wherein said opcode codes a nature of an operation to be executed, wherein said one or more operands define one or more values of parameters of said operation to be executed, wherein said specific sets of instructions are distinguished from one another by difference in at least one instruction opcode, one operand, a literal value, and a number of instructions, wherein, during execution of said specific generator by said microprocessor, said selection instructions make it possible to choose, from said plurality of available coding variants, a coding variant to be executed to generate said set of target instructions, wherein said choice is a function of a random number, wherein said method further comprises acquiring a random number through execution by said microprocessor of said first block of instructions, choosing a coding variant to be executed through execution by said microprocessor of said selection instructions, wherein a choice of coding variant is made as a function of said acquired random number, generating, through execution by said microprocessor, of said specific generator, of said set of target instructions by executing said coding variant chosen as a function of said acquired random number, shifting in said memory of said microprocessor, through execution by said microprocessor of said control instructions, said set of target instructions generated for said microprocessor to execute said target instructions, and executing said set of target instructions by said microprocessor, and wherein said choice of said coding variant to be executed is systematically made only between different coding variants of said predetermined function.

2. The method of claim 1, wherein said random number is pseudo-random.

3. The method of claim 1, further comprising selecting said binary code to represent a cryptographic primitive.

4. A manufacture comprising a non-transitory computer-readable medium having encoded thereon polymorphic binary code of a predetermined function, said binary code being directly executable by a microprocessor that comprises one or more arithmetic and logic units, and a memory in which instructions are stored, wherein said instructions are to be executed by said one or more arithmetic and logic units in a particular order, wherein each instruction comprises an opcode and one or more operands, wherein said opcode codes a nature of an operation to be executed, wherein said one or more operands define one or more values of parameters of said operation to be executed, wherein said polymorphic binary code further comprises a first block of instructions, a second block of instructions, and control instructions, wherein said first block of instructions comprises instructions that, when executed by said microprocessor, acquiring a random number, wherein said second block of instructions comprise instructions for implementing a specific generator, wherein, when executed by said microprocessor, said specific generator generates a set of target instructions, wherein, when executed by said microprocessor, said set of target instructions performs said predetermined function, wherein, when executed by said microprocessor, said control instructions place said target instructions into said memory, wherein said specific generator comprises a plurality of coding variants of said predetermined function, wherein, when executed by said microprocessor, each coding variant generates a specific set of target instructions for performing said predetermined function, wherein said sets of instructions from said specific set of instructions are distinguished from one another by a difference in at least one of an instruction opcode, an operand, a literal value, and a number of instructions, wherein said instructions further comprise selection instructions that make it possible to choose from said plurality of available coding variants, as a function of said random number during execution of said specific generator by said microprocessor, and wherein said specific generator comprises selection instructions that make it possible to choose only coding variants of said predetermined function such that said specific generator has no selection instructions that make it possible to choose coding variants of a function other than said predetermined function.

5. The manufacture of claim 4, wherein at least one of said coding variants to be executed comprises an operand whose value is a function of a random number such that said specific set of target instructions generated by execution of said coding variant varies as a function of said random number.

6. The manufacture of claim 5, wherein said random number is a random number acquired by said first block.

7. The manufacture of claim 4, wherein said control instructions are suitable for modifying, as a function of a random number, an order in said memory of at least two instructions of said set of target instructions generated by said specific generator.

8. The manufacture of claim 4, wherein at least one coding variant comprises an instruction whose operand corresponds to an identifier of a memory register of said microprocessor, and wherein said binary code comprises instructions for modifying a value of said operand as a function of the same or of another random number so as to modify an assignment of registers of said microprocessor each time said random number is modified.

9. The manufacture of claim 4, wherein said predetermined function is configured to process a datum having a value that is only known at upon execution of said predetermined function by said microprocessor, wherein said specific generator is configured for generating a set of specific instructions performing said function, and wherein said value of said datum is directly and only contained in said operands of said specific instructions and not in a register.

10. A method for constructing a polymorphic binary code for execution of a predetermined function, said method comprising acquiring source code of said predetermined function to be executed, and causing a compiler to compile said acquired source code to form executable polymorphic binary code wherein said polymorphic binary code includes instructions and wherein each instruction comprises an opcode and one or more operands, wherein said opcode codes a nature of an operation to be executed, wherein said one or more operands define one or more values of parameters of said operation to be executed, wherein said polymorphic binary code further comprises a first block of instructions, a second block of instructions, and control when executed by said microprocessor, acquiring a random number, wherein said second block of instructions comprises instructions for implementing a specific generator, wherein, when executed by said microprocessor, said specific generator generates a set of target instructions, wherein, when executed by said microprocessor, said set of target instructions performs said predetermined function, wherein, when executed by said microprocessor, said control instructions place said target instructions into said memory, wherein said specific generator comprises a plurality of coding variants of said predetermined function, wherein, when executed by said microprocessor, each coding variant generates a specific set of target instructions for performing said predetermined function, wherein said sets of instructions from said specific set of instructions are distinguished from one another by a difference in at least one of an instruction opcode, an operand, a literal value, and a number of instructions, wherein said instructions further comprise selection instructions that make it possible to choose from said plurality of available coding variants, as a function of said random number during execution of said specific generator by said microprocessor, and wherein said specific generator comprises selection instructions that make it possible to choose only coding variants of said predetermined function such that said specific generator has no selection instructions that make it possible to choose coding variants of a function other than said predetermined function.

* * * * *